April 17, 1945.  M. J. STACOM  2,374,047

PREPARATION OF NUTRITIONAL AND THERAPEUTIC CONCENTRATES

Filed Aug. 3, 1940  2 Sheets—Sheet 1

MATHEW J. STACOM.
INVENTOR

BY
ATTORNEY

Patented Apr. 17, 1945

2,374,047

UNITED STATES PATENT OFFICE 2,374,047

PREPARATION OF NUTRITIONAL AND THERAPEUTIC CONCENTRATES

Matthew J. Stacom, Flushing, N. Y., assignor to Stacom Process Corporation, Long Island City, N. Y., a corporation of New York Application August 3, 1940, Serial No. 351,094

10 Claims. (Cl. 99—11)

This invention relates to the recovery of ingredients present in green food and forage crops and more particularly to the recovery of stabilized liquids from substances such as green alfalfa, cereal grasses, vegetable tops and other substances containing vitamins and other valuable ingredients.

It has been long recognized that alfalfa and other forage and cereal grasses contain ingredients that in concentrated form are of value for their nourishing and therapeutic effect upon animals and humans. In the recovery of such substances in dehydrated form, for example, from alfalfa, it has been the practice to cut the green alfalfa and allow it to cure in the field, or in a curing machine using a tunnel or rotary drier heated to about 150° C. The dried alfalfa is then subjected to grinding and the product is used as an alfalfa meal. However, the chemical reactions that take place during the maturing and drying of the product alters the characteristics of the ingredients from those in the green plant.

In the agricultural production of cereal grasses such as wheat, oats and rye, the plant is allowed to come to maturity and the kernel ripen and harden to produce the resultant commercial products. During the cycle of time required for the kernels in question to pass through that stage when they are in the milk to a hardened condition, the stalk of the plant ceases active metabolistic action, loses its chlorophyl and changes from a green to the color and condition of the straw as we know it. During this period enzyme and other reactions within the stalk are such as to decompose the food values of some of these active constituents and, therefore, the straw that results has very little nutritious value other than the cellulose which, because of its nature, is not an optimum feed for cattle, poultry, etc. and is very rarely eaten, making its use at this time confined to bedding, etc.

On the other hand, in accordance with the principles of the present process, if these grasses are taken in their green active metabolistic condition when the kernels are in the milk, and subjected to treatment by the process, the pressure interrelation of the active components of protoplasm with the moisture present results in the securing of valuable fluids whose concentrates can be used as self-contained food for human consumption, while the bursting of the cells of protoplasm, etc. and the action of the residual fluid left in the stalk as it passes through the pressure zone fibrillates and puts into an assimilable condition the cellulosic content for animal digestive purposes, as well as impregnating the fibrillated structure with the food values of that percentage of the fluids permitted to be retained.

It will be seen from this that two new results are secured. In the first instance, a new self-contained vitamin food concentrate for human consumption, and, in the second instance, cattle and poultry foods of nutritious values which at the present time through standard methods are not available.

Thus, it is an object of this invention to provide a procedure for the recovery of such ingredients whereby they may be obtained with the various constituents present in the same relative proportions as in the ripening or ripened material. A further object is to provide a means whereby destruction of certain ingredients present in the growing substances may be avoided. A further object is to provide a stabilized mixture of expressed liquids that may be reduced to dryness without deterioration. Other objects will become apparent.

Inherent in my process are principles that take into consideration and utilize the phenomenon of photosynthesis in plant life through enforced reactions of their protoplasmic components. It is recognized that green plants through the action of photosynthesis are the only living things that can actually manufacture food from the raw materials of the inorganic world. As the action of photosynthesis progresses several distinctive processes are involved, but since the utilization of plant life for commercial use and for food products takes place after this action has ceased as a complete cycle (harvesting of plant) the important phases to be considered here are that of the living protoplasm, and that of the non-living cellulosic structure.

The living, or protoplasmic, portion is composed of a number of different components that are balanced in such a manner as to provide, when encased in membranes as individual segregated cell life, a functioning unit that can perform, in coordination with the affinitized cells, the various functions of metabolism. Nature, therefore, places within these individual cells the natural catalytic agents or enzymes that contribute their allocated action toward enabling them to maintain at all times the balanced equilibrium of interrelated cell life.

By subjecting the green plant life to a single continuous rolling application of very high but yielding pressures in the absence of destructive heat, the living protoplasmic content of plant life may be thrown back into a condition approaching its original status in the living matter, as produced through the action of photosynthesis, and may be removed from the cellulosic portion of the plant in a highly colloidal and emulsified condition that is necessary to continue its healthy status. The fluids thus recovered from green plant life contain all the components of the protoplasm and with the proper further procedure may be reclaimed en masse or as individual components.

In my process the affinitization of the vitamin, protein, mineral salts, sugars, etc. in the plant life being treated takes place through the quantitative and mass active interrelation of the inherent living components of protoplasm with their solvent and dispersion medium, the moisture present, under high rolling pressures in the absence of destructive heat. The absence of destructive heat permits the retention of the metabolistic values of the protoplasm during abnormal pressure treatment, causing enforced reaction of nature's original evolution of photosynthesis among the components during retention of their living values of synthetic colloidalization. Thus, the method and process results in novel emulsification of the inherent fluids and the stabilization of the contained vitamin and organic food values, in combination with their optimum mineral salts, in their unaltered condition. Because of the stabilized condition of the liquid expressed, it will not deteriorate so rapidly and may be kept at ice box temperatures. Also, it permits retention of the natural values of the ingredients during drying as in vacuum driers, thus retaining in the concentrated powder or paste, the values present in the growing plant.

In the field of vitamins it is becoming increasingly recognized that the administration of a single vitamin, such as A, in its isolated or synthetic form, for the correction of malnutrition or disease, results in setting up abnormal conditions in the system through the depletion of other substances, caused by the excessive consumption of these other substances whose utilization are necessary to the release or correct functioning of the values of the vitamin A administered. While correction of the initial condition may be secured, the subsequent reaction of the patient in other directions is a serious factor to be considered.

It is the purpose of my affinitized and self-contained concentrated products to eliminate this condition by permitting the administration of vitamins in their normal quantitative and unaltered condition and relation, which supplies the deficiency for the particular result required while avoiding the depletion of the normal equilibrium of vitamins or other substances in the organic system under treatment. It will be seen that nature has provided in plant life some types of plant which abound in vitamin A, others run to C, and still others run to B in this respect, so that the corrective measures with my foods are first to determine that vitamin in which the system is lacking and then to select the food concentrate which predominates in that vitamin, but still has affinitized within itself those other vitamins, mineral salts, sugars, enzymes, etc., which will make the releasing or functioning of the required vitamin self-sustaining, thus permitting its corrective and curative effects upon the system with no deleterious reactions due to the causes pointed out.

These results may be obtained by causing the enforced resynthesis of the living components of the protoplasm under abnormally high pressures and in the absence of destructive heat, and once this has been done these components will have been stabilized and can be preserved over periods of time without deterioration.

Figure 1:
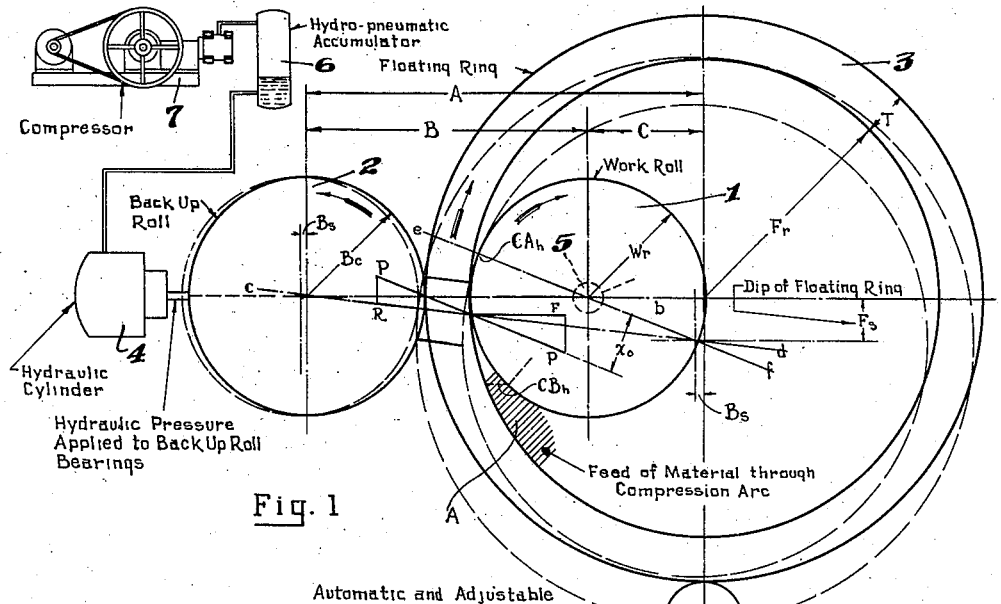
Figure 1 is a diagrammatic view of the apparatus employed in carrying out my invention.

Figures 3 to 6 inclusive are fragmentary diagrammatical views showing various phases of the operation of the mechanism employed in carrying out the process of the present invention.

In carrying out the invention as applied to alfalfa, the green alfalfa is subjected, as soon after harvesting as practical, to a single continuous application of pressure of sufficient strength to separate the major portion of the liquids contained in the alfalfa in the single application of the pressure. The single application of pressure of the strength referred to is important, since by this procedure the liquids naturally contained in the alfalfa are retained as it advances into the pressure zone and serve the important functions of cushioning the material, providing means for internal bursting of the liquid-containing cells and providing means whereby the heat units liberated by the application of high pressures may be quickly carried away so as to avoid destructive heating of the liquid or solid materials.

The liquids recovered by this treatment contain vitamins and other valuable ingredients of the plant life in the relative proportions in which they exist in the growing plant, and provide a substance that, having been stabilized, may be dried by a quick drying process and reduced to a solid substance containing the valuable ingredients of the plant life in the relative proportions required for the proper growth of such plant life. This product may be fed, with or without other substances, to animals and to humans in order to supply the vitamins, protein substances, mineral salts, sugars, enzymes, etc. present in the growing vegetables.

The solid constituents may be used as a feed for animals or may be returned to the soil as a fertilizer or used as a mulch, etc.

The recovered liquids or their dehydrated residue may be used for various purposes where it is desired to utilize the mixture of ingredients present in the particular substances treated. For example, in addition to their use as food or therapeutic substances for animals, humans, fishes or birds, they may also be used in bringing about desirable reactions, such, for example, as a food for other vegetable substances, or in the prevention of pollution in streams. When they are used for the latter purpose, the liquids may also be of value as feed substances for the fishes and other life present in the streams. For such last mentioned uses it may be desirable from an economical standpoint to use liquids from trees, bushes, etc. where some portion of the l'quids themselves may be of less value for human or animal consumption than are obtained as a by-product in the recovery of the cellulosic material.

The ring and roller apparatus employed in carrying out the method or process of the present invention and the general manner of applying pressure to the material is described in my co-pending application, Serial No. 253,202, filed January 27, 1939. The general process is described therein and in my co-pending application, Serial No. 195,776, filed March 14, 1938, of which the present application is a continuation in part.

A general showing of the machine or apparatus is shown in the Figures 1 to 6 inclusive of the drawings and its manner of operation as applicable to the method of obtaining concentrates suitable for nutritional or therapeutic uses forming the present invention will be described for more clearly bringing out the method involved.

The continuous roller type or roller and ring hydraulic press utilized in carrying out the present invention consists mainly of three rotating members, i. e., the work roll 1, the back-up roll 2, and the floating ring 3 as illustrated in Figure 1. The unique action of these rotating members with the application of a constant hydraulic pressure force on the assembled mechanism and power applied to the work roll provides means for production in the separation of fluids from solids, resulting in a continuous progressive variable pressure process for materials containing moisture in any form and provides for efficient separation of the liquid components from the solids with the absence of heat.

The work roll 1 rotates in a clockwise direction and is supported on fixed journals (not shown); it takes the thrust of the hydraulic cylinder 4 and reacts upon the substance or material being treated. Power is applied to the shaft 5 of the work roll at constant speed. The back-up roll rotates in a counterclockwise direction, and as shown clearly in my co-pending application above referred to is supported in movable journals (not shown in Figure 1) which are constrained to move in a horizontal plane. Hydraulic pressure applied by means of the hydraulic cylinder 4 supplies a constant force through the floating ring 3 to the blanket of material being processed and indicated at A. This force acting upon and in combination with the floating ring 3 and the work roll 1 produces a variable pressure on the processed material. The floating ring 3 rotating in a clockwise direction has no journal bearings, but is constrained to rotate with the inner and outer faces parallel to the surfaces of the work roll 1 and the back-up roll 2.

The floating ring 3 is free to move with its center passing through an arc. The center of the radius of this arc coincides with the center of the back-up roll 2. This arc or movement takes place only below the horizontal center-line $a$, $b$, as indicated by the dimension $F_3$.

The weight of the floating ring 3 is supported by hydraulic force on the assembly of the rolls which tends to keep the centerline of the rolls and the floating ring in line.

This is the neutral position of the three rotating members and in this position no work is being done. The floating ring 3 is free to move vertically through its arc of movement which movement is influenced entirely by the feed and resistance of the material being treated moving with the ring 3 through the compression arc or space between the work roll 1 and the floating ring 3.

The hydraulic cylinder 4 supplies a constant force applied to the roll and ring assembly. This force, equalized into two parts is transmitted to the back-up roll through the journal bearing; a static pressure is supplied to the hydraulic cylinder 4 from a hydro-pneumatic accumulator of any approved type generically indicated at 6. The fluid medium employed is hydraulic oil and the pressure is maintained in the hydro-pneumatic accumulator by compressed air. The accumulator 6 is charged by a compressor 7 of any approved type, and the pressure of the hydraulic cylinder 4 may be varied by varying the air pressure in the accumulator 6 to suit the conditions required and to apply the proper pressures to the particular type of material being treated to efficiently express the liquids from the substance being treated in accordance with the present invention.

The hydraulic system is only one of storage, and in addition to providing the desired pressure on the ring and roll assembly provides means for pressure regulation.

Figures 3 to 6 inclusive of the drawings show the relation of the ring and roll assembly and the blanket of material or substance in process through four successive and distinctive stages. These four stages or phases and synchronized relation of the main components continue to exist throughout the operation of the machine. The floating ring 3 is continuously sustained in balance by the hydraulic force and the reactions of the forces of resistance of the substances or material being treated against the work roll 1.

Figure 3:
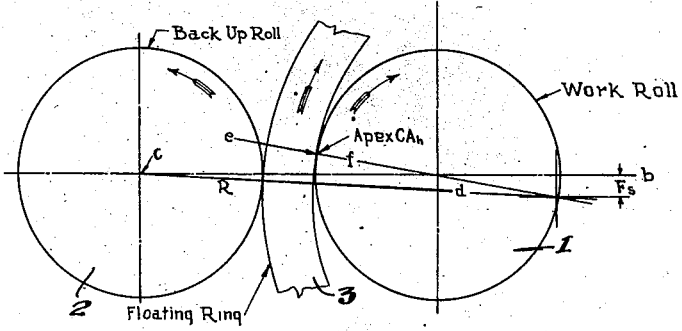

Figure 3 shows the ring and roll assembly before any substance or material to be treated is in the machine, or just prior to feed acceptance of the ring and rolls. The floating ring 3 is slightly dipped below the horizontal centerline $c$, $b$, due to the weight of the floating ring. The weight of the floating ring 3 also slightly moves the back-up roll 2 against the hydraulic pressure and the apex of the horn angle or compression arc between the floating ring 3 and the work roll 1 is slightly advanced causing an opening between the floating ring and the work roll on the centerlines $cb$ and $cd$.

This is an important characteristic of the machine employed in carrying out the present process in that the floating ring 3 and the work roll 1 are in contact, metal to metal, at the beginning of operation or at any subsequent cycle when material has ceased to flow due to intermittent operation. This relation continues to exist until the material or substance to be treated is fed into the machine and the forces of resistance of the substances change this balanced relation of the floating ring 3.

Figure 4:
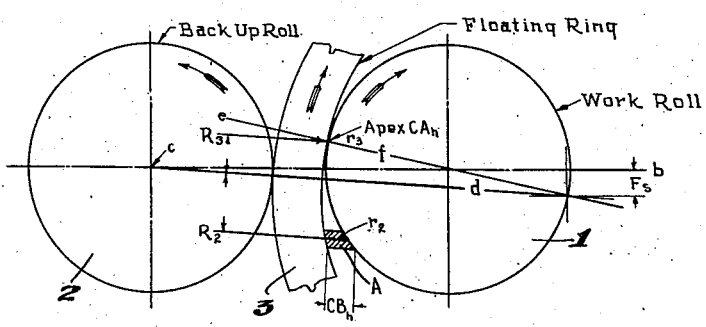

Figure 4 of the drawings shows the next step wherein the feed of the substance being treated has taken place with the work roll surface $CB_h$ and has passed through the initial pressure zone. All food or forage plants, substances or those of like nature, reach the point of feed acceptance in comparatively loose form so that the material passes through the first stage of compression at a low pressure of resistance. However, since the floating ring 3 is in balance even this low pressure causes an additional dip of the floating ring 3 against the hydraulic forces applied to the back-up roll 2, advancing the apex of the horn angle or compression arc A as shown.

The resistance of the material indicated by $r_2$ plus the weight of the floating ring is reacted upon by the force component $R_2$ and resistance $r_3$ is reacted upon by force $R_3$ satisfying the balancing equation on the floating ring 3. $R_2$, $x_2 = R_3$, $x_3$ where $R_2$ plus $R_3 = R$ the force resulting from the hydraulic thrust.

Figure 5:
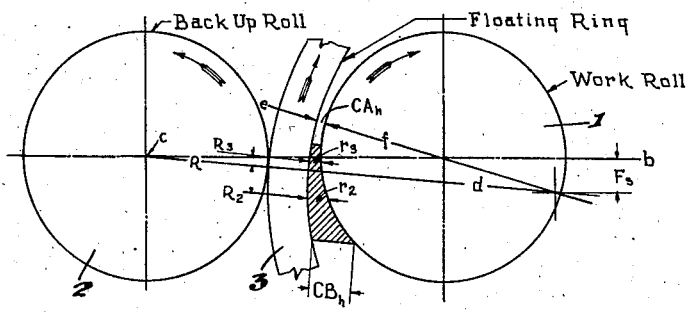

Figure 5 illustrates the balancing forces on the floating ring when the material has passed the line of force $c$, $d$. Due to the acute angle formed by the work roll 1 and the floating ring 3, the material is forced through the successive pressure zones under compression, setting up a resistance which reacts against the floating ring 3 and moves the back-up roll 2 against the force of the hydraulic cylinder 4. This results in the floating ring 3 leaving contact with the work roll 1 thereby forming a clear horn angle or compression arc, in advance of the material as is clearly shown in this Figure 5.

The equation of forces and reactions continue to balance the floating ring 3 as is shown and described in connection with Figure 4.

Figure 6:
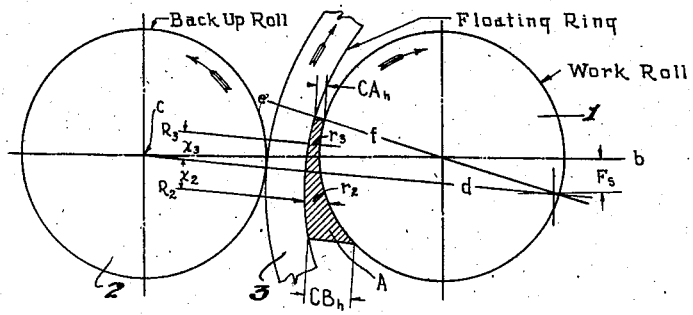

Figure 6 illustrates the complete blanket A of material or substance passing through the horn angle, or compression arc, and shows the action of the ring and roller type of hydraulic press upon the material. In the machine shown, the compression forces are always in balance. The floating ring 3 is allowed free movement up to the point of the maximum volume of the blanket of material or substances being treated, for the required production. It will be noted from Figures 1 and 3 that the pressure force is applied to the material or substance being treated through a line contact, or the tangents of the back-up roll 2 and the floating ring 3 on the centerline $c$, $d$. After the material or substance being treated passes through this line of contact, the total pressure force R divides itself into two force components $R_2$ and $R_3$. The floating ring 3 is free to move up or down to balance the moments of $R_2 x_2$ and $R_3 x_3$ which is one of the characteristic features of the machine.

There can be no shearing of the blanket of material or substance being treated since, due to the balancing of components of forces $R_3$ and $R_2$ equalizing pressures on the full blanket of the material or substance takes place and the pressure is always distributed over the entire blanket. There is, therefore, no concentration of pressure forces at any one point to create shear through the blanket of the material or substance in process.

The force resultant R, which must always coincide with the centerline $c$, $d$, shifts continuously to balance the equation $R_2 x_2 = R_3 x_3$ which determines the dip of the floating ring 3.

The continuous ring and roller type of hydraulic press illustrated and just generically described will separate the fluids from the cellulose in various species of plant life through the medium of a cold (atmospheric temperature) process. This is accomplished by means of a progressive variable pressure being applied in the manner as above described and as particularly illustrated in Figure 2 of the drawings.

The base height of the horn angle or compression space $CB_h$ is influenced by the point of feed acceptance and volume of maximum feed of the material or substance being treated. The apex height of the compression arc $CA_h$ is determined by the ratio of the inherent volumes of the material at $CB_h$ and $CA_h$. Expansion and release of the processed material or substance takes place beyond the apex $CA_h$.

The compression arc between $CB_h$ and $CA_h$ in the pressure zone and the pressure on the material produced by the hydraulic cylinder 4 varies in intensity through the entire arc or compression space as indicated by the magnitude of the ordinates of force $f$ and resistance $r$ shown. The resistance of the material to compression varies with the product being processed. Plants of a fibrous nature containing voids and moisture pass through the pressure zone or compression space under a gradual increase in pressure, from zero to maximum pressure in pounds per square inch, or per line inch of width of material or substance being treated until the material or substance reaches the apex $CA_h$, at which only a small portion of the liquid or moisture remains. This characteristic of the continuous ring and roll type hydraulic press allows for the free expression or extrusion of the liquid or fluid in the opposite direction to the movement of the material. That is, the fluid or liquid expressed always moves or flows from a zone of a higher pressure in the compression space to a zone of lower pressure, never to a zone of higher pressure, and consequently carries away heat which is generated in the expressing action so as to prevent any excessive heating of the liquid expressed, thus avoiding overheating of the expressed liquid and any of its solid constituents, and further preventing the increasing of the temperature of the liquid expressed to a degree which would be detrimental to or affect the condition of a liquid and its advance components. It allows for the liberation or dispersion of all of the protoplasmic liquid components at pressure under which they are in natural suspension in the plant or substance. It can readily be affirmed that if all such components, having variable pressure dispersion resistance, are passed through graduating pressures, from a higher to a lower pressure zone, without area resistance, they will be released in the natural stabilized form.

Figure 2:
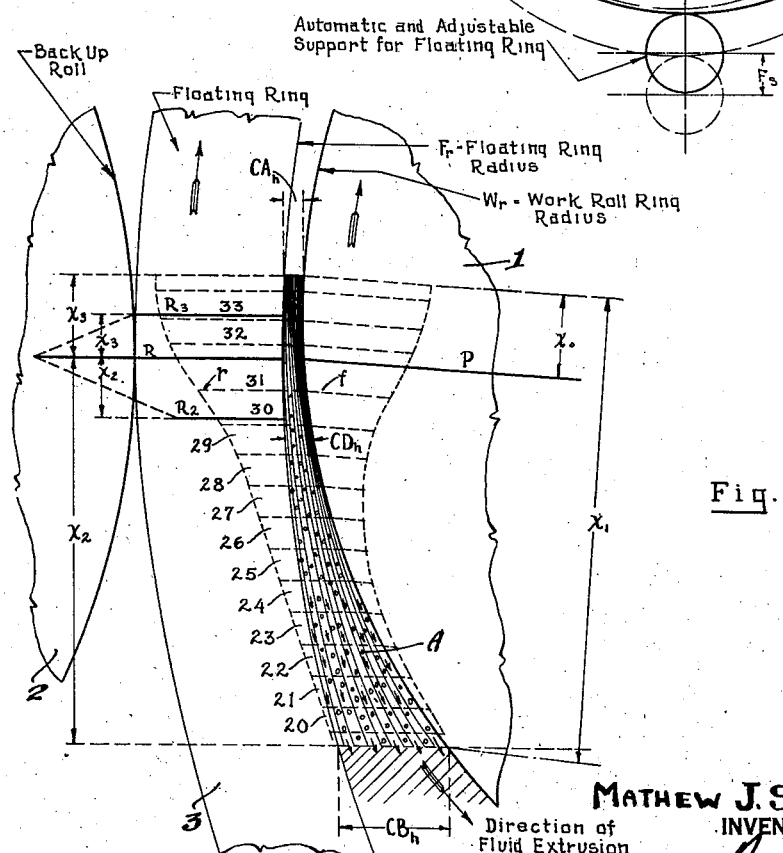
Figure 2 is a diagrammatic fragmentary view illustrating the manner of application of pressure to the material being treated.

As illustrated in Figure 2 of the drawings, the pressure zones, which are indicated by the areas 20, 21, 22, 23, 24, 25, 26, 27, 28, 29, 30, 31, 32, and 33 increase in volume gradually in the direction of fluid or liquid extrusion, so that water as a carrying agent with the liquid components, moves from a zone of higher pressure and restricted area to that of a lower pressure zone and increasing area in successive steps without un-stabilizing the components of the fluids extruded or expressed.

In processing any substance or material, the maximum pressure required is selected by experience or trial, and is of such magnitude as to enable the release of the liquid component offering the greatest resistance, which component is thereby liberated prior to the material passing through the highest pressure zone 23 at the apex $CA_h$.

All of the liquid expressed from the material or substance being treated passes through the base of the compression arc or horn angle $CB_h$ from where it is allowed to flow into a vessel (not shown) or other suitable container for further separation as set out herein.

Only a general illustration of the machine and its method of operation is herein given because the specific construction of the machine forms no part of the present invention and is set forth in my co-pending application above referred to.

As a specific example of the treatment of alfalfa, an alfalfa having the following characteristics was treated:

| Alfalfa—as cut: | Per cent |
| --- | --- |
| Moisture content | 80.88 |
| Solids | 19.12 |
| | 100 |

| Alfalfa—after drying: | Per cent |
| --- | --- |
| Moisture | 3.16 |
| Protein | 29.61 |
| Fat | 2.79 |
| Fiber | 18.70 |
| Ash | 6.32 |
| Nitrogen free extract | 39.42 |
| | 100 |

| | |
| --- | --- |
| Micrograms vitamin A—per gram, dry basis | 362 |
| Micrograms vitamin B (flavin)—per gram, dry basis | 22.8 |

The green alfalfa was passed through a ring and roller apparatus such as that described in my copending application Serial No. 253,202, filed January 27, 1939, and by a process as described therein and in my copending application Serial No. 195,776, filed March 14, 1938, of which the present application is a continuation in part. The pressure applied in this operation was about 4000 pounds per line inch of width of material treated and the pressure was applied to the alfalfa in random or interlaced positions at a rate of about 20 feet per minute by means of a ring and roller normally in contact. During this operation the temperature rise of the material in the high pressure zone was no greater than about 25° F. The liquid extract was dried by evaporation under reduced pressure at a temperature of about 100° F. to obtain dry solids containing the ingredients present in the liquid of the growing plant.

From 7.4 tons of green alfalfa treated as described above, about one ton of meal, and 925 pounds of dried solids (bone dry) from the expressed liquid, were obtained. These contain the following constituents:

One ton of alfalfa meal:
    Protein _____ per cent__ 19
    Mineral salts (ash) _____ do___ 4.52
    Vitamin A _____ units per gram__ 30
    Vitamin B (flavin) _____ do___ 17.3

Dry solids from expressed liquids (925 pounds):
    Protein _____ per cent__ 35
    Mineral salts (ash) _____ do___ 9.04
    Vitamin A _____ units per gram__ 640.5
    Vitamin B (flavin) _____ do___ 30.6

The solids from the expressed liquids may be divided into water soluble and water insoluble solids by extracting with water and filtering, producing the following:

Insoluble solids (422 pounds) containing:
    Protein _____ per cent__ 43.7
    Mineral salts (ash) _____ do___ 6.5
    Vitamin A _____ units per gram__ 800
    Vitamin B (flavin) _____ do___ 12

Water soluble solids (sugars, etc.) (503 pounds) containing:
    Protein _____ per cent__ 27
    Mineral salts (ash) _____ do___ 11.3
    Vitamin A _____ units per gram__ 0
    Vitamin B (flavin) _____ do___ 46.6

Due to the fact that no solvents are used to remove the soluble ingredients and due to the residual fluids permitted to remain in it, the fibrous solids still contain considerable food value and may be used as a cattle feed or it may be returned to the soil in the form of a mulch, fertilizer, etc. to supply organic material, etc. essential to plant growth. As an example, the alfalfa meal from the process may have the following characteristics:

|                      | Per cent |
|----------------------|----------|
| Moisture             | 9.05     |
| Ash                  | 4.3      |
| Nitrogen             | 3.01     |
| Crude protein        | 18.8     |
| Fat                  | 2.2      |
| Nitrogen free extract| 40.4     |
| Crude fibre          | 25.25    |

The liquids, and the solids separated from the liquids, may be used as or with a food for animals, birds, fish or humans or, if desired, it may be used as a plant food to supply particular ingredients that are lacking in the environment of the plant. By drying at low temperatures or by quick drying at higher temperatures, the vitamin content of the liquids may be retained and chemical changes in the liquids prevented. By following the procedure described, the quantity of vitamins recovered from the alfalfa is approximately double that returned by the usual method.

The natural contents of the alfalfa include ingredients that make it useful for numerous therapeutic purposes, for example, in the treatment of cancer, in the treatment of arthritis, in the treatment of yellow jaundice, and the liquids and solids expressed from them may be used in such treatments.

Although specific reference has been made to the recovery of liquids and solids from alfalfa, the process may be applied to other green cereal grasses, such as wheat, oats, rye, barley, kaffir corn, millet, doura, sorghum, maize, teosinte, as well as to green vegetables and vegetable tops, such, for example, as beet tops, carrot tops, endive, fennel, spinach, kale, mangel tops, mustard spinach, parsley, rutabaga tops, onion tops, celery, soya bean plants, buckwheat, cow-peas, Swiss chard, shallu, turnip tops, vetch and chicory. It may also be applied to grasses such as fescue, bent, timothy, clover, etc. and other food and forage crops and similar substances or to medicinal plants containing vitamins and other valuable ingredients in the growing green plant. For example, ferns, yarrow, milkweed, sassafras, wild mustard, dill and golden rod may be so treated. Also, mixtures of these various green grasses, etc. may be used to produce liquids and solids containing the desired mixed ingredients. The various fluid extracts referred to above, if immediately capped to exclude the air, may be kept for long periods without spoilage. Such products make available in a separated form all the natural nutritious food elements and medical properties of the natural vegetable substances.

The amount of pressure referred to in the above example is illustrative and may be varied depending upon the apparatus used and the particular material being treated. Pressures of 1000 to 10,000 pounds per line inch of width of material being treated, and preferably pressures of 3000 to 6000 pounds per line inch, are suitable with a ring having an inside diameter of 20 inches and a roller having a diameter of 10 inches. For treating cereal grasses, pressures of about 6000 pounds per line inch and, for alfalfa, pressures of about 3000 or 4000 pounds per line inch are preferred. With a larger apparatus, higher pressures may be used to advantage. The rate of application of the pressure is preferably about 20 to 150 feet per minute. The important factor in governing the amount and rate of application of the pressure is that it be such that the liquid may be quickly removed from the cells and pores of the plant life and will serve as a cushioning means and as a means for carrying away the heat units developed in the high pressure zone; thus avoiding overheating of the liquid or solid constituents. The temperature of the material in the high pressure zone should not exceed 150° F. and should preferably be between 75 and 125° F. If desired, precooling of the material or cooling of the apparatus during pressing may be utilized to maintain the temperature indicated, or lower temperatures. The pressure should also be such as to remove the components of the protoplasmic cells of the living plants and disperse them in the inherent moisture content of the living plant to provide a balanced relation of the components of the plant such as exists in the living plant. The rate of application of the pressure should be such as to quickly remove the liquids so as to avoid deleterious temperatures that might otherwise result from the high pressures applied. After the optimum pressure for accomplishing this result is reached, no appreciable advantage is gained by additional pressure during the expression. Lower pressures have the advantage of permitting acceptance of a heavier volume of feed and obtaining a lower percentage reabsorption of surface moisture from the inner roller and surface of the ring after the material is released in the upper portion of the apparatus. This effect may be reduced in a larger machine by a longer angle of approach and a greater high pressure area.

The pressure applied is preferably such as to remove the liquid constituents contained in the material treated in substantially the same proportions and condition as they exist in the living substance. Thus the constituents may be recovered in the proper proportions and with the proper enzymes and catalysts for digestion or metabolism. The starches and proteins in the plant may be thereby put into such association with the enzymes as to aid in the digestion of these and provide food products of high value for human and animal consumption.

The removal of enzymes or other catalysts and other constituents as in the procedure described herein also avoids the deterioration of the cellulose that otherwise might take place in their presence in the non-living substances and results in a more stable cellulosic residue. Also, due to the expression of the fluids through minute orifices at high pressures, the liquid may be recovered in the form of an emulsion or colloidal suspension that is relatively stable under normal conditions but from which valuable constituents may be recovered by various methods applicable to the separation of emulsions or colloidal suspensions. Such constituents may include the separation of colloidal cellulose and other valuable substances.

Many other applications of the invention will be apparent to those skilled in the various arts and it is not intended to restrict the invention to the particular examples given as illustrative. In other uses of the invention, variations will undoubtedly be desirable in the particular apparatus, procedures, pressures, temperatures, etc. used and it is intended to include such variations within the scope of the invention. The terms used in describing the invention have been used in their descriptive sense and not as terms of limitation and it is intended that all equivalents thereof be included within the scope of the appended claims.

I claim:

1. A method for obtaining concentrates suitable for nutritional or therapeutic uses, comprising cutting a food or forage crop while growing, and applying a pressure of over 1,000 pounds per line inch of width of material being treated to the cut substance while green and having its natural cellular structure, without increasing the temperature of the material in the pressure zone to over about 150° F., said pressure advancing at a rate of about 20 feet per minute and upwards to separate the major portion of the non-cellulosic ingredients present, in substantially the proportions and conditions in which they are present in the growing plant, in a single passage of the material through the pressure zone.

2. A method for obtaining concentrates suitable for nutritional or therapeutic uses, comprising cutting a food or forage crop while growing, and applying to the material being treated while having its natural cellular structure a pressure of about 1000 to 10,000 pounds per line inch progressing at a rate of about 20 to 150 feet per minute and without increasing the temperature of the material by over about 75° F.

3. A method for obtaining concentrates suitable for nutritional or therapeutic uses, comprising cutting a food or forage plant while growing, cooling the cut plant and subjecting it while green and cooled and without increasing the temperature of the material in the pressure zone to over about 150° F. to pressures of over 1000 pounds per line inch of width of material being treated, advancing over the material at a rate of about 20 feet per minute and upwards and with sufficient force to separate substantial quantities of noncellulosic ingredients present in a single through pass of the material.

4. A method of obtaining concentrates suitable for nutritional or therapeutic uses comprising moving a food or forage substance upwardly through a pressure zone yieldably applying pressure to the substance in the pressure zone and gradually increasing the pressure on the substance from the point of entrance to the point of exit of the pressure zone so as to express the liquid constituents from the substance at the pressure degree sufficient to express starches, proteins, enzymes and catalysis in liquid form in substantially the same proportions and condition as they exist in the growing substance.

5. A method of obtaining vitamin concentrates suitable for nutritional or therapeutic uses comprising moving a food or forage substance upwardly through a pressure zone, yieldably applying pressure to the substance in the pressure zone and gradually increasing the pressure on the substance from the point of entrance to the point of exit of the pressure zone so as to express the liquid constituents from the substance at the pressure degree sufficient to express starches, proteins, enzymes and catalysis in liquid form in substantially the same proportions and condition as they exist in the growing substance, removing water soluble solids from the expressed liquid and recovering said water soluble solids by evaporation.

6. A method of obtaining vitamin concentrates suitable for nutritional or therapeutic uses comprising moving a food or forage substance upwardly through a pressure zone, yieldably applying pressure to the substance in the pressure zone and gradually increasing the pressure on the substance from the point of entrance to the point of exit of the pressure zone so as to express the liquid constituents from the substance at the pressure degree sufficient to express starches, proteins, enzymes and catalysis in liquid form in substantially the same proportions and condition as they exist in the growing substance, removing water soluble solids from the expressed liquid and recovering said water soluble solids by evaporation, and removing the water insoluble solids by extracting them from the expressed liquid with water and filtering.

7. A method for obtaining concentrates suitable for nutritional or therapeutic uses, comprising moving a food or forage substance to be treated upwardly through an upwardly tapering pressure zone, extracting liquid constituents from the substance by applying yielding pressure in progressively increasing increments as the substance moves upwardly through the pressure zone, and advancing the pressure beyond the normal line of direction of maximum pressure application by shifting one side of the pressure zone upwardly relative to the opposite side in accordance with the resistance of the material to compression.

8. A method for obtaining concentrates suitable for nutritional or therapeutic uses, comprising moving a food or forage substance to be treated upwardly through an upwardly tapering pressure zone, extracting liquid constituents from the substance by applying yielding pressure in progressively increasing increments as the substance moves upwardly through the pressure zone, and advancing the pressure beyond the normal line of direction of maximum pressure application by shifting one side of the pressure zone upwardly relative to the opposite side in accordance with the resistance of the material to compression, said increasing pressure advancing sufficiently from the minimum to the maximum degree in said pressure zone to burst liquid-containing cells between the fibers of the substance and release their liquid content, and allowing the released liquids to always flow from an area of higher pressure to an area of lower pressure.

9. A method for obtaining concentrates suitable for nutritional or therapeutic uses, comprising moving a food or forage substance to be treated upwardly through an upwardly tapering pressure zone, extracting liquid constituents from the substance by applying yielding pressure in progressively increasing increments as the substance moves upwardly through the pressure zone and advancing the pressure beyond the normal line of direction of maximum pressure application by shifting one side of the pressure zone upwardly relative to the opposite side in accordance with the resistance of the material to compression, and evaporating the contained water from the extracted liquids to recover the solids.

10. A method for obtaining concentrates suitable for nutritional or therapeutic uses, comprising moving a food or forage substance to be treated upwardly through an upwardly tapering pressure zone, extracting liquid constituents from the substance by applying yielding pressure in progressively increasing increments as the substance moves upwardly through the pressure zone and advancing the pressure beyond the normal line of direction of maximum pressure application by shifting one side of the pressure zone upwardly relative to the opposite side in accordance with the resistance of the material to compression, removing water soluble solids from the extracted liquid and recovering said water soluble solids by evaporation, and removing the water insoluble solids by extracting them from the expressed liquid with water and filtering.

MATTHEW J. STACOM.